United States Patent [19]

Buchanan et al.

[11] Patent Number: 5,458,362
[45] Date of Patent: Oct. 17, 1995

[54] VEHICLE SAFETY APPARATUS

[75] Inventors: William R. Buchanan, Romeo; John P. Wallner, Rochester, both of Mich.

[73] Assignee: TRW Vehicle Safety Systems Inc., Lyndhurst, Ohio

[21] Appl. No.: 255,478

[22] Filed: Jun. 8, 1994

[51] Int. Cl.$^6$ .................................................. B60R 21/16
[52] U.S. Cl. ........................ 280/728.2; 280/732; 280/741
[58] Field of Search ............................... 280/728 A, 732, 280/741

[56] References Cited

U.S. PATENT DOCUMENTS

| | | | |
|---|---|---|---|
| 4,153,273 | 5/1979 | Risko | 280/740 |
| 4,332,398 | 1/1982 | Smith | 280/732 |
| 5,069,480 | 12/1991 | Good | 280/743 R |
| 5,234,227 | 8/1993 | Webber | 280/728 A |
| 5,257,815 | 11/1993 | Bachelder et al. | 280/728 A |
| 5,342,084 | 8/1994 | Rose et al. | 280/728 A |
| 5,356,175 | 10/1994 | Rose et al. | 280/728 A |

FOREIGN PATENT DOCUMENTS 2265121  9/1993  United Kingdom ............... 280/728 A Primary Examiner—Kenneth R. Rice
Attorney, Agent, or Firm—Tarolli, Sundheim & Covell

[57] ABSTRACT

An apparatus for inflating an inflatable vehicle occupant restraint such as an air bag (80) includes an inflator (90) having an axis (30) and first and second spaced end portions (92, 94). A housing (12) has first and second spaced apart side walls (20, 22) at least partially defining a chamber (26) which receives the inflator (90). The apparatus includes means (96, 98) for securing the first end portion (92) of the inflator (90) to the first side wall (20). Means for securing the second end portion (94) of the inflator (90) to the second side wall (22) comprises an adaptor (140). The adaptor (140) has a first portion (142) engaging the second side wall (22) and a second portion (160) engaging and supporting the inflator (90) at a location in the chamber (26) spaced inward from the housing second side wall (22).

36 Claims, 5 Drawing Sheets

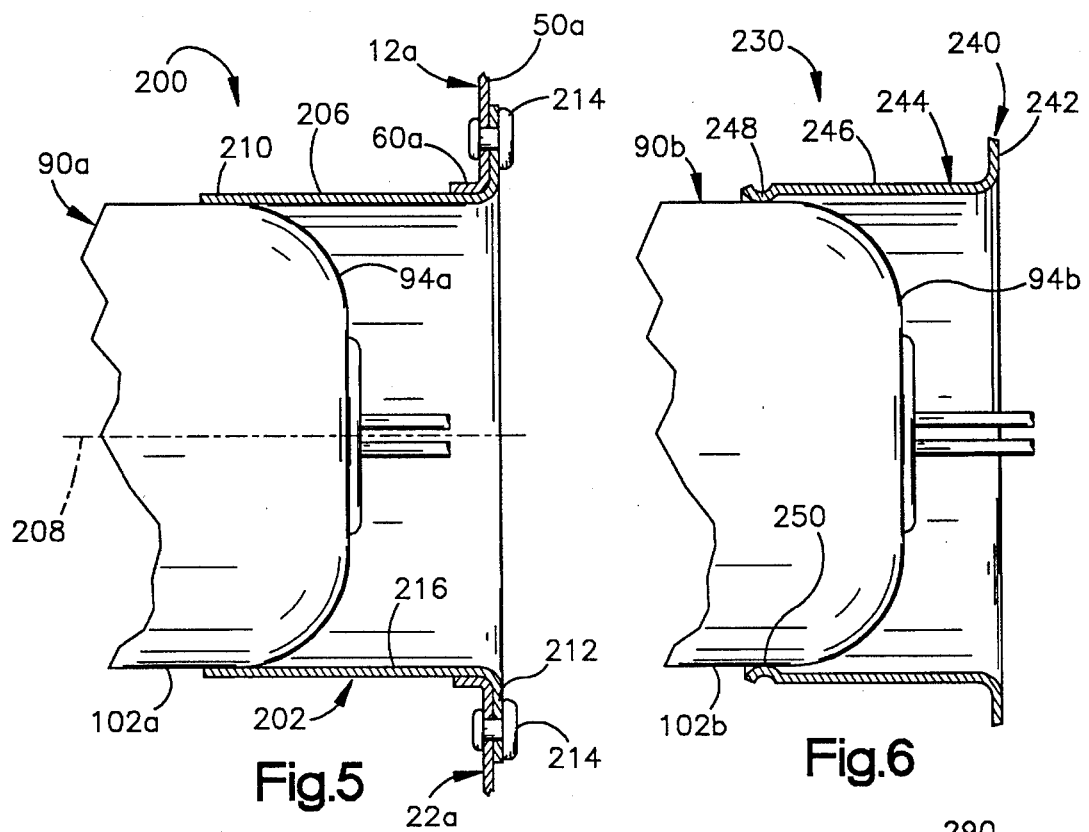
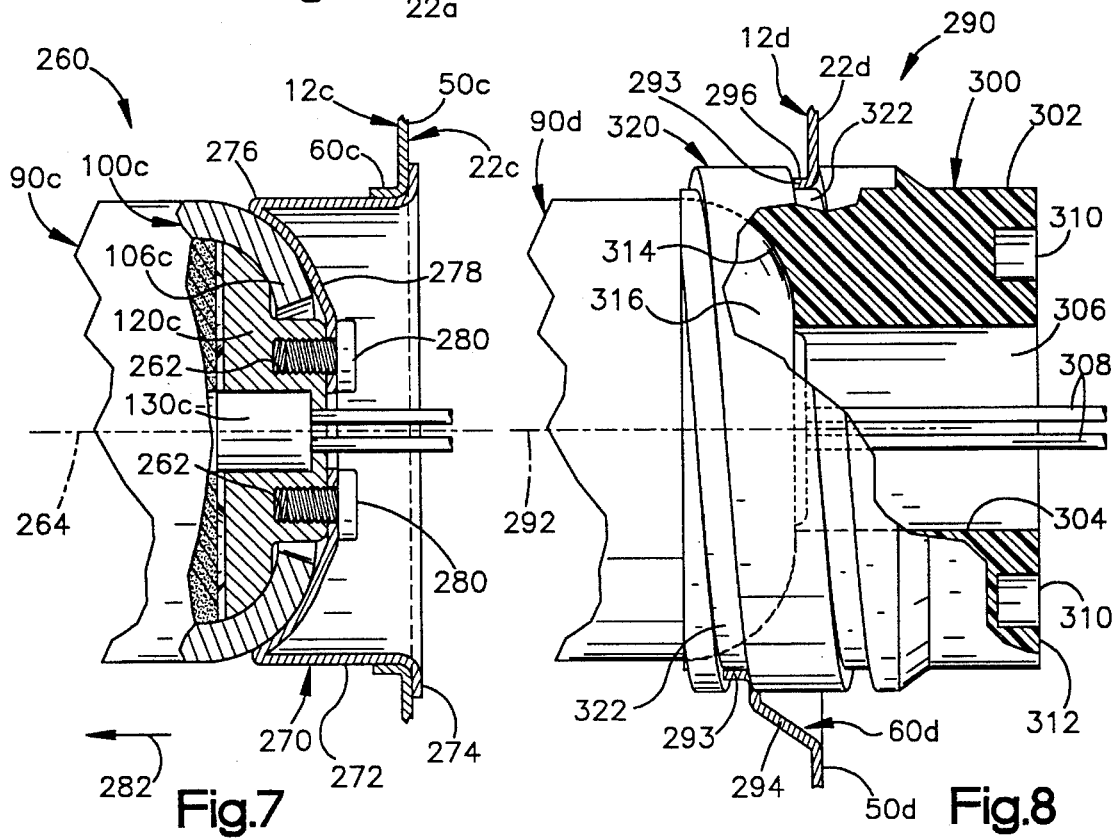

5,458,362

VEHICLE SAFETY APPARATUS

BACKGROUND OF THE INVENTION

1. Technical Field

The present invention relates to a vehicle safety apparatus, and is particularly directed to a vehicle safety apparatus which includes an adaptor for securing an air bag inflator to a housing.

2. Description of the Prior Art

It is known to inflate an air bag to restrain a vehicle occupant in the event of a vehicle collision. A typical air bag assembly includes an air bag folded and stored in a housing along with an inflator. The inflator has an elongate cylindrical shape. Opposite ends of the inflator are secured to opposite side walls of the housing. In the event of a vehicle collision, the inflator is actuated to direct inflation fluid into the air bag. The air bag inflates from the folded and stored condition to an unfolded and inflated condition to restrain the vehicle occupant.

It may sometimes be necessary or desirable to use, in connection with an existing housing, an inflator which is structurally different than the inflator the housing was designed to store. The structurally different inflator may be shorter or smaller in diameter or otherwise physically different than the inflator the housing was designed to store. In such a circumstance, the structurally different inflator might not easily be secured to the walls of the housing.

SUMMARY OF THE INVENTION

The present invention is an apparatus for inflating an inflatable vehicle occupant restraint such as an air bag. The apparatus comprises an inflator having an axis and having first and second spaced end portions. A housing has first and second spaced apart side walls at least partially defining a chamber which receives the inflator. The apparatus includes means for securing the first end portion of the inflator to the first side wall. The second end portion of the inflator is secured to the second side wall by an adaptor having a first portion engaging the second side wall and a second portion engaging and supporting the inflator at a location in the chamber spaced inward from the housing second side wall.

BRIEF DESCRIPTION OF THE DRAWINGS

Further features of the present invention will become apparent to those skilled in the art to which the present invention relates from reading the following specification with reference to the accompanying drawings, in which:

FIG. 5 illustrates a vehicle safety apparatus in accordance with a second embodiment of the invention;

FIG. 6 illustrates a vehicle safety apparatus in accordance with a third embodiment of the invention;

FIG. 7 illustrates a vehicle safety apparatus in accordance with a fourth embodiment of the invention;

FIG. 8 illustrates a vehicle safety apparatus in accordance with a fifth embodiment of the invention;

DESCRIPTION OF PREFERRED EMBODIMENTS OF THE INVENTION

Figure 1:
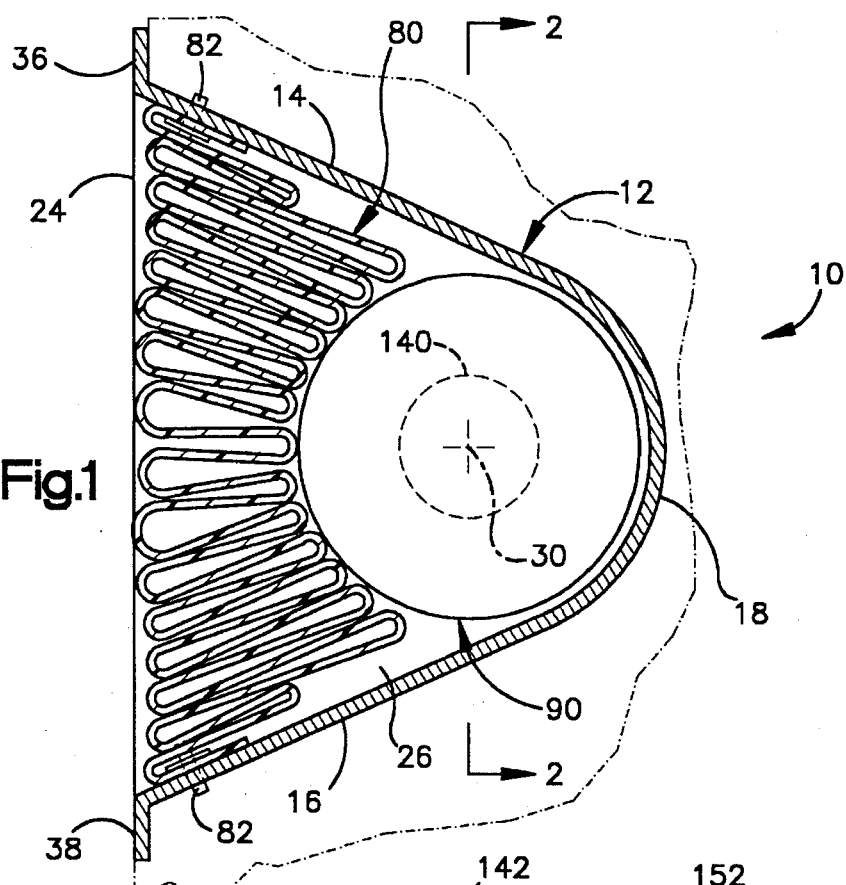
FIG. 1 is a schematic sectional view of a vehicle safety apparatus in accordance with the present invention.

The present invention relates to a vehicle safety apparatus, and is particularly directed to a vehicle safety apparatus which includes an adaptor for securing an air bag inflator to a housing. The present invention is applicable to various vehicle safety apparatus constructions. As representative of the present invention, FIG. 1 illustrates a vehicle safety apparatus 10 in accordance with a first embodiment of the invention.

The vehicle safety apparatus 10 includes a reaction canister or housing 12. The housing 12 is made of sheet metal and includes generally planar upper and lower walls 14 and 16. The housing 12 further includes a curved central wall 18 extending between and interconnecting the upper wall 14 and the lower wall 16 to form the C-shaped cross-sectional configuration shown in FIG. 1.

Opposed parallel side walls 20 and 22 (FIG. 2) of the housing 12 extend perpendicular to the upper and lower walls 14 and 16 at opposite ends of the C-shaped configuration. The edges of the housing walls 14, 16, 20, and 22 define an opening 24 in the housing 12 opposite the central wall 18. The housing walls 14, 16, 18, 20, and 22 also define a chamber 26 (FIG. 1) in the housing 12. An axis 30 of the vehicle safety apparatus 10 extends longitudinally between the side walls 20 and 22 of the housing 12. In the illustrated embodiment, the axis 30 is disposed parallel to and equidistant between the upper and lower walls 14 and 16.

A pair of flanges 36 and 38 on the upper and lower walls 14 and 16 secure the housing 12 to a portion (not shown) of the vehicle such as the vehicle instrument panel. The vehicle safety apparatus 10 also includes a cover (not shown) which closes the opening 24 into the housing 12. The cover is preferably made of plastic and may form a portion of the vehicle instrument panel.

The first side wall 20 (FIG. 2) has parallel planar inner and outer major side surfaces 40 and 42. A circular opening 44 extends through the first side wall 20. The opening 44 is centered on the axis 30. The second side wall 22 has a planar main body portion 50 with parallel inner and outer major side surfaces 52 and 54. The inner side surface 54 is presented toward the first side wall 20. An annular flange 60 projects from the main body portion 50 into the chamber 26. The flange 60 is formed as one piece with the main body portion 50 and has parallel axially extending inner and outer peripheral surfaces 62 and 64 (FIG. 3). An annular radially extending end surface 66 of the flange 60 is spaced axially inward from the main body portion 50, that is, in a direction into the chamber 26 as indicated by the arrow 68. The flange 60 defines a circular opening 70 (FIG. 2) in the housing second side wall 22. The opening 70 is centered on the axis 30. The opening 70 is larger in diameter than the opening 44 in the first side wall 20.

An air bag 80 (FIG. 1) is folded and stored in the chamber 26 in the housing 12. The air bag 80 is secured to the housing 12 in a known manner by suitable fasteners indicated schematically at 82.

An inflator 90 (FIGS. 1 and 2) is disposed in the chamber 26 between the air bag 80 and the curved central wall 34 of the housing 12. The inflator 90 has an elongate cylindrical shape with an axis which is coincident with the axis 30. One or more gas outlets (not shown) are formed in the inflator 90. Inflation fluid is directed, upon actuation of the inflator, through the gas outlets into the chamber 26 to inflate the air bag 18.

The inflator 90 (FIG. 2) has first and second opposite end portions 92 and 94. The first end portion 92 is disposed adjacent to the first side wall 20 of the housing 12. A threaded mounting stud 96 projects axially from the first end portion 92 through the opening 44 in the first side wall 20. A nut 98 is threaded on the mounting stud 96 and contacts the outer major side surface 42 of the first side wall 20.

A side wall 100 (FIGS. 2 and 3) of the inflator 90 extends between the first and second end portions 92 and 94 of the inflator. The inflator side wall 100 is a tubular member having parallel cylindrical outer and inner surfaces 102 and 104. A curved end portion 106 (FIG. 3) of the side wall 100 forms a part of the second end portion 94 of the inflator 90. The curved end portion 106 has an outer surface 108 and an inner surface 110. An end surface 112 of the curved end portion 106 defines a circular opening 114 centered on the axis 30.

The inflator 90 includes an end cap 120 (FIG. 3). The end cap 120 has an annular radially extending end surface 122. A curved outer peripheral surface 124 of the end cap 120 is in abutting engagement with the inner surface 110 of the curved end portion 106 of the inflator side wall 100. The curved end portion 106 secures the end cap 120 in the inflator 90.

An igniter 130 (FIG. 3) is mounted in a chamber 132 in the end cap 120. A pair of lead wires 134 extend axially from the igniter 130 through a central opening 136 in the end cap 120 and through the opening 114 in the inflator side wall 100. The inflator 90 also includes a quantity of gas generating material (not shown) in an internal chamber 138 of the inflator, along with other components such as a filter, etc.

Figure 4:
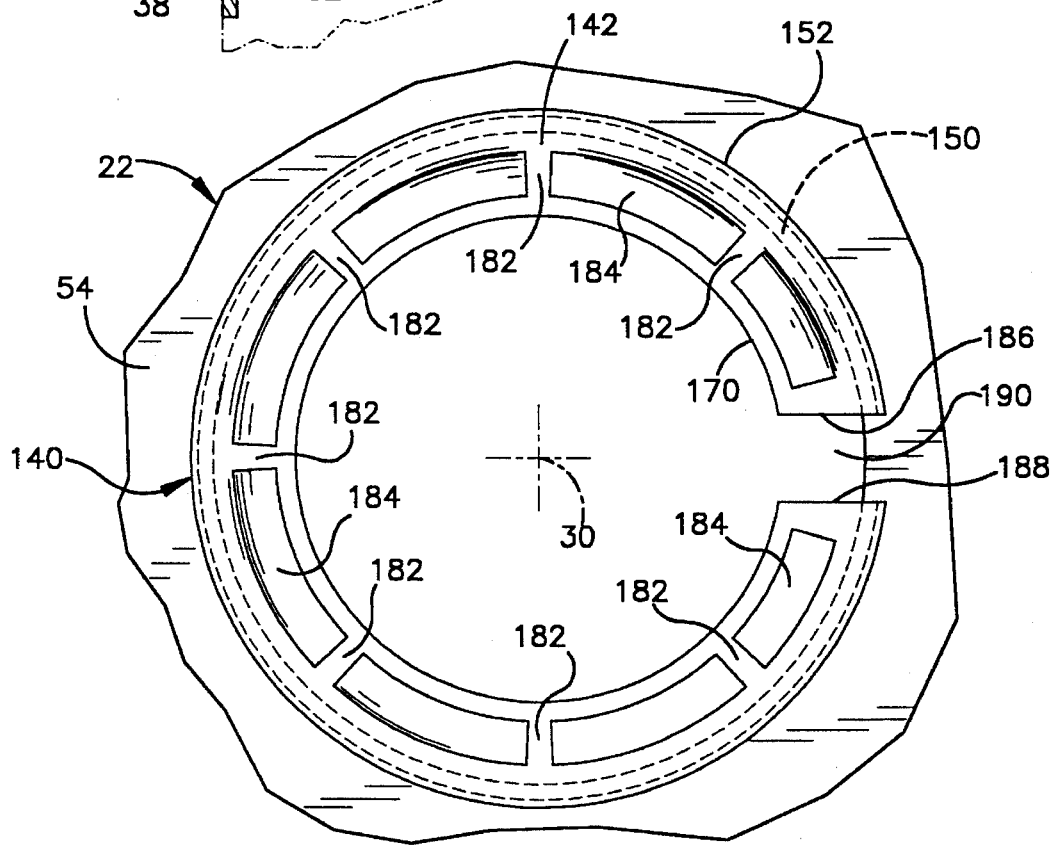
FIG. 4 is a view taken along line 4—4 of FIG. 2, with the inflator removed.

An adaptor 140 (FIG. 2) encircles the second end portion 94 of the inflator 90 and supports the end portion 94 on the second side wall 22 of the housing 12. The adaptor 140 is made from a resilient plastic material, preferably heat stabilized high impact nylon 6/6, such as DuPont Zytel® ST-801 HS. The adaptor 140 has an annular split-ring configuration as best seen in FIG. 4.

The adaptor 140 includes a first portion 142 (FIG. 3) for engaging the second side wall 22 of the housing 12. On the outer periphery of the adaptor first portion 142 is an annular radially extending surface 144 disposed axially inward of the main body portion 50 of the side wall 22. A cylindrical surface 146 extends axially outward (in a direction to the right as viewed in FIG. 3) from the surface 144. A curved annular surface 148 extends axially and radially outward from the surface 144. The three surfaces 144, 146 and 148 together define an annular groove 150 on the outer periphery of the adaptor 140. An end portion 152 of the adaptor first portion 142 is disposed radially outward of the surfaces which define the groove 150.

A second portion 160 of the adaptor 140 engages the inflator 90. The adaptor second portion 160 has converging outer and inner surfaces 162 and 164. The inner surface 164 is contiguous with a curved annular surface 166 which extends axially outward and radially inward from the surface 164.

The adaptor second portion 160 merges into a third portion 170 of the adaptor 140 which is disposed radially inward of the first portion 142. The adaptor third portion 170 has radially outer and inner surfaces 172 and 174 which extend at an acute angle to the axis 30. The surfaces 172 and 174 merge into parallel axially extending surfaces 176 and 178, respectively. An annular end surface 180 extends radially between the surfaces 176 and 178.

A series of planar radially extending ribs 182 (FIG. 4) interconnect the adaptor first portion 142 and third portion 170. The ribs 182 define between them a series of cavities 184 in the adaptor 140. Spaced apart parallel surfaces 186 and 188 (FIGS. 3 and 4) define a gap 190 in the adaptor 140. The gap 190 extends axially for the entire length of the adaptor 140 to form the split-ring configuration shown in FIG. 4.

The vehicle safety apparatus 10 (FIG. 2) is assembled by first positioning the inflator 90 in the chamber 26 in the housing 12. To do this, the inflator 90 is moved in the direction 68 through the opening 70 in the housing second side wall 22. The mounting stud 96 is inserted through the opening 44 in the housing first side wall 20. The nut 98 is threaded on the mounting stud 96. The nut 98 is tightened down against the housing first side wall 20 and cooperates with the mounting stud 96 to secure the first end portion 80 of the inflator 90 to the first side wall 20 of the housing 12.

With the parts of the vehicle safety apparatus 10 in the condition just described, the second end portion 94 of the inflator 90 is disposed in the chamber 26 at a location spaced inwardly from the housing second side wall 22. Specifically, the second end portion 94 of the inflator 90 is disposed axially inwardly (to the left as viewed in FIGS. 2 and 3) of a reference plane 192 which is coplanar with the inner major side surface 52 of the housing second side wall 22. No parts of the inflator 90, including the second end portion 94, are in contact with the housing second side wall 22. The adaptor 140 is, at this point in the assembly process, not yet associated with the housing 12 and the inflator 90.

Next, the adaptor 140 is squeezed or compressed circumferentially in a manner so as to move the end surfaces 186 and 188 (FIG. 4) toward each other to close the gap 190. This decreases the overall diameter of the adaptor 140. The overall diameter of the adaptor 140 is decreased sufficiently so that the second portion 160 of the adaptor can fit through the opening 70 in the housing second side wall 22. The adaptor 140 is then moved in the direction 68 through the opening 70.

When the flange 60 of the second side wall 22 of the housing 12 is disposed adjacent to the groove 150 in the adaptor 140, the adaptor 140 is released and springs radially outwardly. The flange 60 engages in the groove 150 on the outer periphery of the adaptor 140. The inner circumferential surface 62 of the flange 60 engages the cylindrical surface 146 of the groove 150. The radially extending end surface 66 of the flange 60 is in abutting engagement with the radially extending surface 144 of the groove 148. The resilience of the adaptor 140 holds the adaptor in place radially in the opening 70 in the housing side wall 22.

When the adaptor 140 is in this position relative to the housing side wall 22, the adaptor second portion 160 is disposed in the chamber 26. The inner surface 164 of the adaptor second portion 160 engages the cylindrical outer surface 102 of the inflator side wall 100. The adaptor 140 supports the second end portion 94 of the inflator 90 in the housing 12.

The length of the adaptor 140 (as measured in a direction parallel to the axis 30) is selected to provide axial loading of the parts of the assembled apparatus 10 between the housing side walls 20 and 22. The housing side walls 20 and 22 are typically made from sheet metal about 1 mm thick, which is somewhat flexible. Preferably, the axial distance between the left end (as viewed in FIG. 2) of the inflator 90 and the groove surface 144 of the adaptor 140 is slightly greater than the distance between the inner major side surface 40 of the first side wall 20 of the housing 12 and the end surface 66 of the flange 60 of the second side wall 22. Thus, when the parts are assembled as shown in FIG. 3, the adaptor 140 urges the housing second side wall 22 in a direction to the right as viewed in FIG. 3. The housing side walls 20 and 22 are spread apart axially. As a result, the radially extending groove surface 144 on the adaptor 140 firmly engages the radially extending end surface 66 on the flange 60 of the second side wall 22. This engagement blocks axial movement of the inflator 90 relative to the housing side walls 20 and 22.

If either the adaptor 140 or the inflator 90 is configured differently than as illustrated, the adaptor might engage the curved outer surface 108 of the curved end portion 106 of the inflator side wall 100. It is believed that the inflator 90 is better supported by engaging the inflator at its full diameter rather than at the smaller diameter curved end portion. If it is necessary to support a shorter inflator, an adaptor such as the adaptor 140 can be provided which projects farther into the chamber 26.

FIG. 5 illustrates a vehicle safety apparatus 200 in accordance with a second embodiment of the invention. The vehicle safety apparatus 200 includes a housing 12a which is identical to the housing 12 illustrated in FIGS. 1–4, and an inflator 90a which is identical to the inflator 90. The vehicle safety apparatus 200 also includes an adaptor 202 for supporting one end portion 94a of the inflator 90a on the second side wall 22a of the housing 12a. The other end portion of the inflator 90a and the other housing side wall are not illustrated in FIG. 5, as their construction is identical to that illustrated with reference to the first embodiment of the invention.

The adaptor 202 is a tubular member preferably made from sheet metal or plastic having a cylindrical side wall 206 and an axis 208 coincident with the longitudinal central axis of the inflator 90a. The adaptor side wall 206 is disposed radially inward of and in abutting engagement with the flange portion 60a of the housing side wall 22a. The adaptor side wall 206 has an inner end portion 210.

A radially extending flange portion 212 of the adaptor 202 is disposed axially outward of and in abutting engagement with the main body portion 50a of the housing side wall 22a. A plurality of axially extending rivets, two of which are shown at 214, secure the adaptor flange 212 to the housing side wall main body portion 50a. Thus, the adaptor 202 is fixedly connected with the housing side wall 22a.

The end portion 94a of the inflator 90a is spaced axially inward, that is, in a direction to the left as viewed in FIG. 5, from the housing side wall 22a. The cylindrical configuration of the adaptor side wall 206 fits closely around the cylindrical configuration of the inflator 90a. Specifically, the adaptor side wall 206 has a cylindrical inner peripheral surface 216 which is approximately the same diameter as the cylindrical outer peripheral surface 102a of the inflator 90a. Thus, the adaptor end portion 210 engages and supports the inflator end portion 94a at a location spaced inwardly from the housing side wall 22a.

FIG. 6 illustrates a vehicle safety apparatus 230 in accordance with a third embodiment of the invention. The vehicle safety apparatus 230 includes an inflator 90b which is identical to the inflator 90 (FIGS. 1–4). The inflator 90b has an end portion 94b and a cylindrical side wall with an outer cylindrical surface 102b. The vehicle safety apparatus 230 also includes a housing 240 having a generally planar side wall 242.

An adaptor 244 is a tubular cylindrical member formed as one piece, preferably from sheet metal, with the housing side wall 242. The adaptor 244 has a cylindrical side wall 246 extending perpendicular to the plane of the housing wall 242. An annular radially inward projecting ridge 248 on the side wall 246 has an inner peripheral surface 250 in abutting engagement with the outer peripheral surface 104b of the inflator 90b. The adaptor 244 supports the inflator 90b relative to and on the housing 240 at a location disposed axially inward, that is, to the left as viewed in FIG. 6, of the housing side wall 242.

FIG. 7 illustrates a vehicle safety apparatus 260 in accordance with a fourth embodiment of the invention. The vehicle safety apparatus 260 includes a housing 12c which is identical to the housing 12 of FIGS. 1–4. A side wall 22c of the housing 12c has a planar main body portion 50c and a axially inwardly extending annular flange 60c.

The vehicle safety apparatus 260 includes an inflator 90c which is similar but not identical to the inflator 90 illustrated in FIGS. 1–4. The inflator 90c has a cylindrical side wall 100c with a curved end portion 106c. The side wall 100c engages and supports an end cap 120c. The end cap 120c receives an igniter 130c. A plurality of axially extending threaded openings 262 in the end cap 120c, two of which are shown, are disposed in a circular array about an axis 264 of the apparatus 260.

An adaptor 270 has a cylindrical side wall 272 in abutting engagement with the housing flange 60c. A radially outwardly extending flange portion 274 of the adaptor 270 is in abutting engagement with the main body portion 50c of the housing side wall 22c. At its end opposite the flange portion 274, the adaptor side wall 272 is bent radially inwardly around its entire circumference as indicated at 276 to form a curved inner portion 278. The adaptor inner portion 278 engages the curved end portion 106c of the inflator side wall 100c and also engages the inflator end cap 120c.

A plurality of screws 280, equal in number to the number of the threaded openings 262, extend through openings in the adaptor inner portion 278 and are screwed into the openings 262. The screws 280 secure the adaptor 270 to the inflator 90c. Thus, the inflator 90c is supported on the housing side wall 22c.

Figure 2:
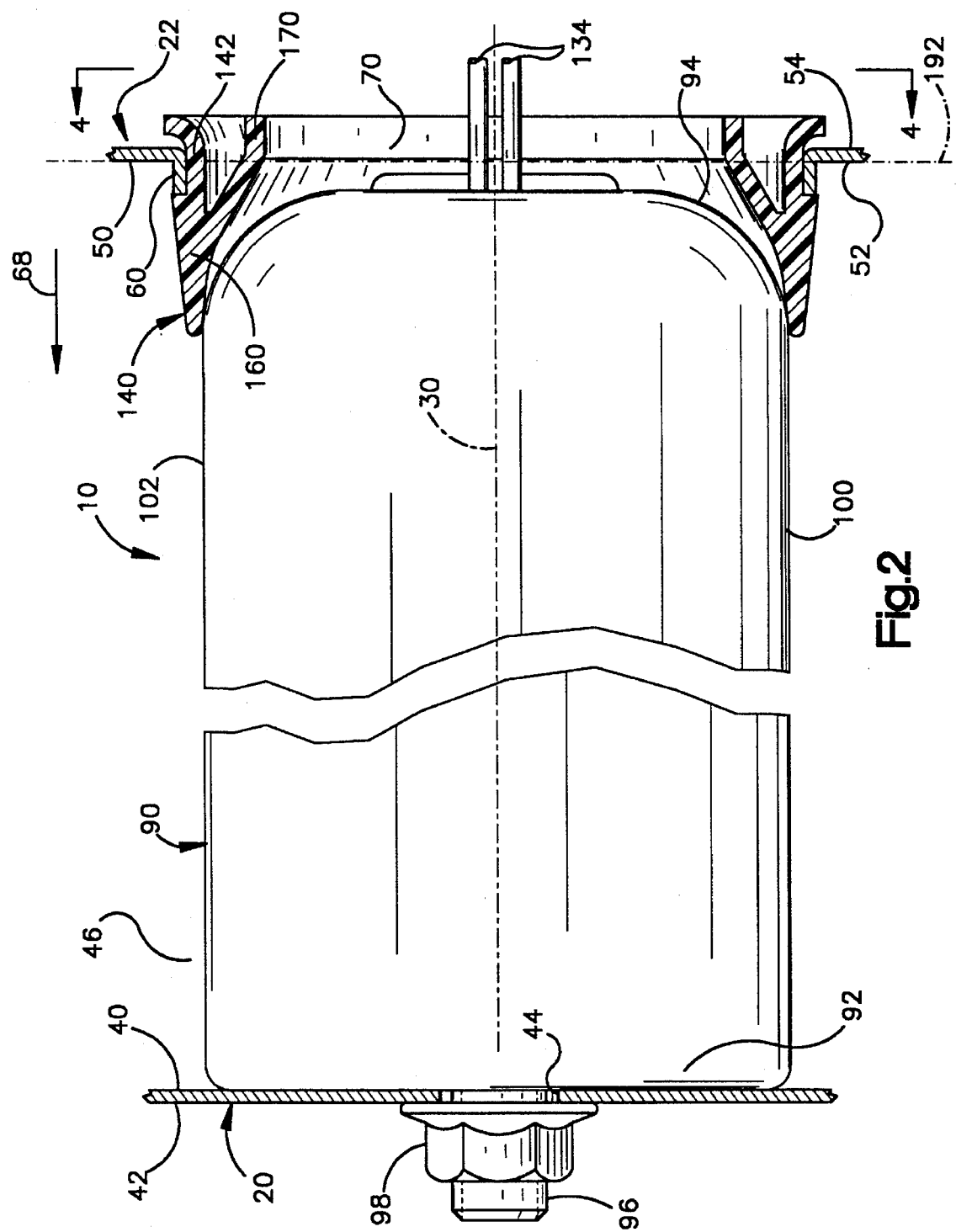
FIG. 2 is a sectional view taken along line 2—2 of FIG. 1.
Figure 3:
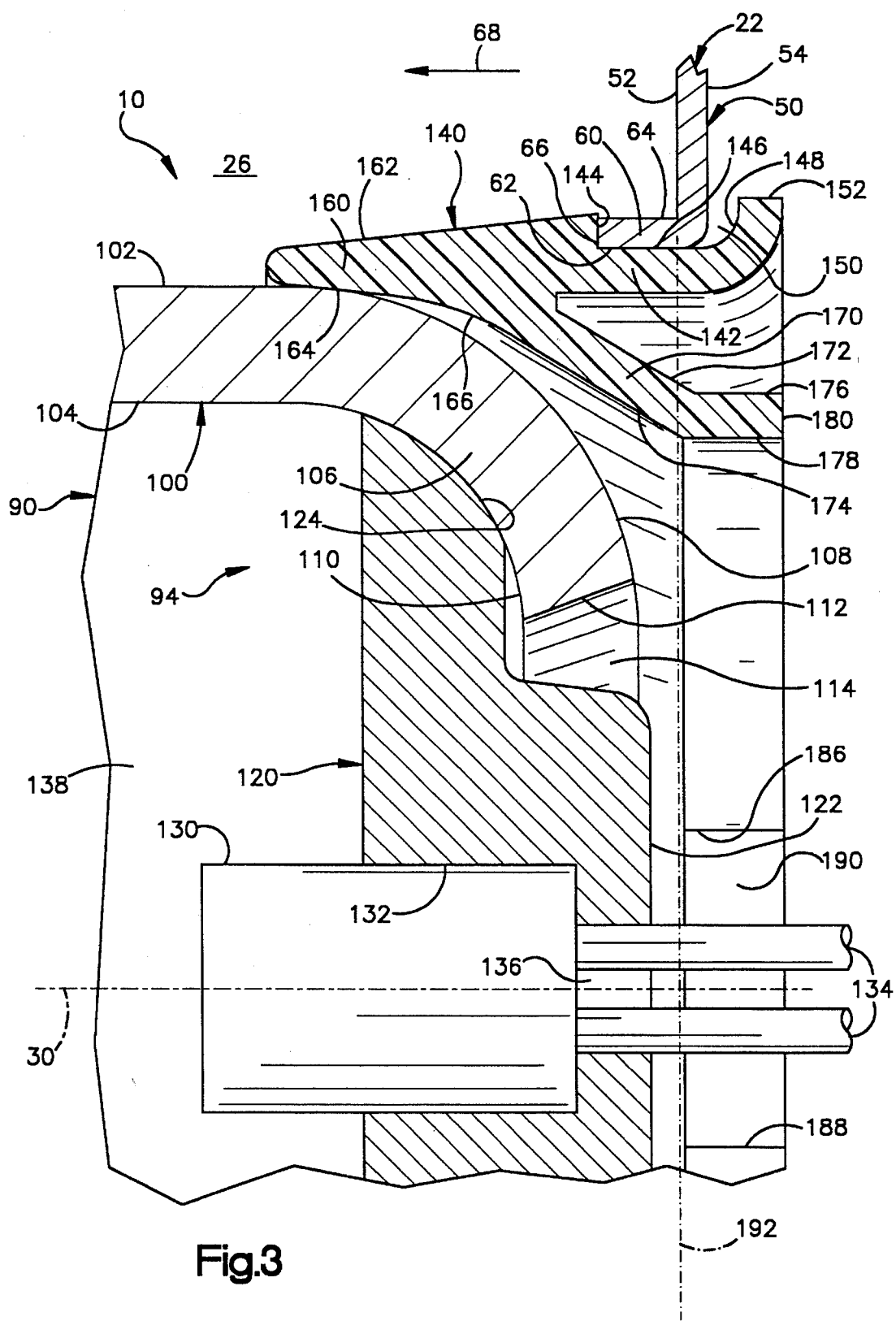
FIG. 3 is an enlarged view of a portion of FIG. 2 showing the inflator in section.

The opposite end (not illustrated) of the vehicle safety apparatus 260 includes a threaded mounting stud connection like that illustrated in FIG. 2. The tightening of the threaded mounting stud connection draws the adaptor 270 (FIG. 7) axially inward in a direction as indicated by the arrow 282. The adaptor flange 274 is drawn tightly against the housing side wall 22c. Thus, the adaptor 270 securely supports the inflator 90c in the housing 12c.

FIG. 8 illustrates a vehicle apparatus 290 in accordance with a fifth embodiment of the invention. The vehicle safety apparatus 290 includes an inflator 90d which is identical to the inflator 90 of the first embodiment of the invention. The vehicle safety apparatus 290 has a longitudinal central axis 292. A housing 12d is identical to the housing 12 of FIGS. 1–4. The housing 12d includes a side wall 22d having a planar main body portion 50d and an annular inwardly projecting flange 60d. The flange 60d extends at an angle to the side wall main body portion 50d and defines an opening in the main body portion 50d. The axially inner portion 293 of the flange 60*d* which defines the opening is helical in shape and is formed as an internal thread convolution. Thus, the portion of the flange 60*d* which is indicated at 294 projects farther into the chamber 26*d* than does the diametrically opposite portion of the flange which is indicated at 296.

The vehicle safety apparatus 290 includes an adaptor 300 for mounting the inflator 90*d* to the housing side wall 22*d*. The adaptor 300 is a generally cylindrical block of plastic or other material having an outer peripheral surface 302 and an inner peripheral surface 304. The inner surface 304 defines a central passage 306 through which lead wires 308 of the inflator 90*d* extend. A plurality of driver openings 310 for receiving a driver member (not shown) are formed in the outer end face 312 of the adaptor 300. At its opposite end, the adaptor 300 has a curved annular surface 314 of the same configuration as the curved outer surface 316 of the inflator 90*d*. A thread convolution 320 is formed on the outer peripheral surface 302 of the adaptor 300. The thread convolution 320 includes a helically extending groove 322 to mate with the helically shaped portion 293 of the flange 60*d*.

To assemble the vehicle safety apparatus 290, a driver member (not shown) is inserted into the driver openings 310 on the adaptor 300. The adaptor 300 contacts and is Screwed into engagement with the housing side wall 22*d*. The portion 293 of the housing side wall flange 60*d* is received in the groove 322. The adaptor 300 is screwed into the housing 12*d* until the inner side wall 314 of the adaptor 300 engages the outer surface 316 of the inflator 90*d*. The adaptor 300 thus supports the inflator 90*d* on the housing side wall 22*d*.

Figure 9:
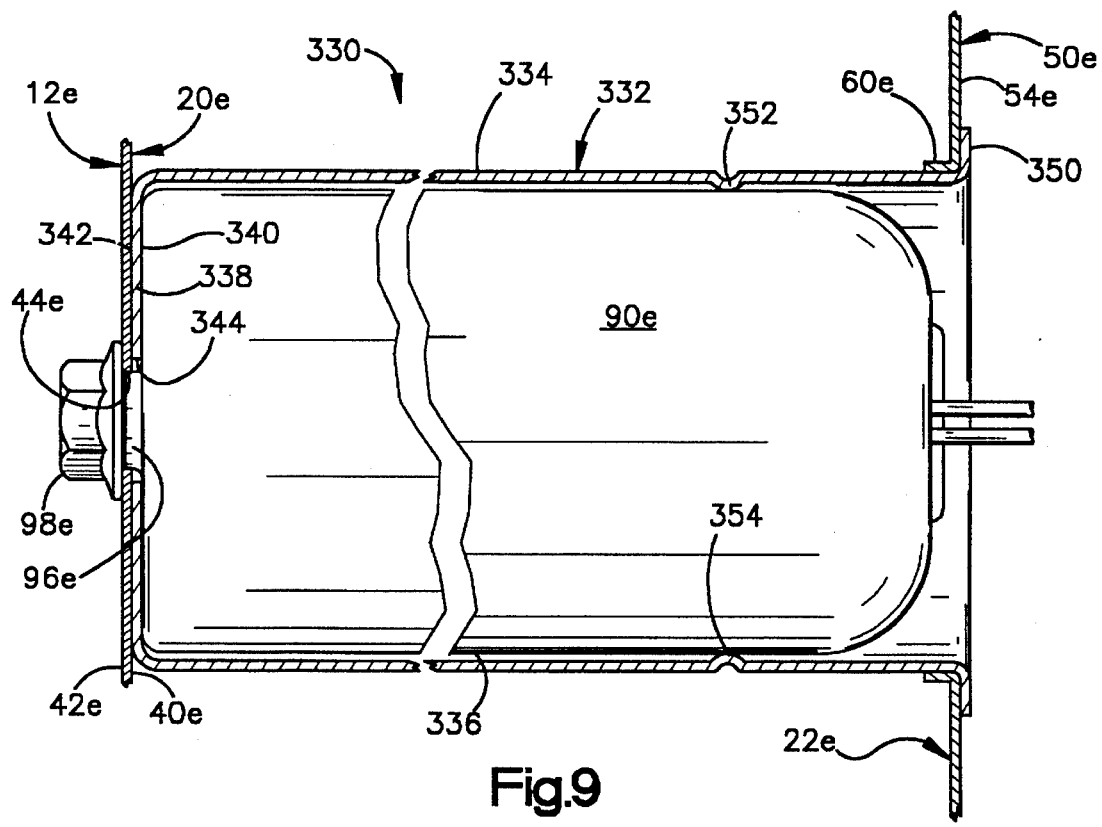
FIG. 9 illustrates a vehicle safety apparatus in accordance with a sixth embodiment of the invention.

FIG. 9 illustrates a vehicle safety apparatus 330 in accordance with a sixth embodiment of the invention. The vehicle safety apparatus 330 includes an inflator 90*e* which is identical to the inflator 90 of FIGS. 1–4.

The vehicle safety apparatus 330 also includes a housing 12*e* identical to the housing 12 of FIGS. 1–4. The housing 12*e* has opposed parallel first and second side walls 20*e* and 22*e*. The first side wall 20*e* has inner and outer major side surfaces 40*e* and 42*e*. A circular opening 44*e* extends through the housing first side wall 20*e*. The second side wall 22*e* includes a planar main body portion 50*e*. An annular flange 60*e* projects axially inward from the main body portion 50*e* and defines a circular opening in the second side wall 22*e*.

An adaptor 332 extends between the housing side walls 20*e* and 22*e* and supports the inflator 90*e*. The adaptor 332 is a tubular cylindrical member, preferably made from sheet metal, which circumscribes the inflator 90*e* for the entire length of the inflator. A cylindrical side wall 334 of the adaptor 332 extends around the outer periphery 336 of the inflator 90*e*. A circular end wall 338 of the adaptor 332 extends radially inward from the side wall 334 at a location adjacent to the first side wall 20*e* of the housing 12*e*. The end wall 338 has inner and outer major side surfaces 340 and 342. A circular opening 344 extends through the end wall 338.

An annular flange 350 at the opposite end of the adaptor 332 extends radially outward from the cylindrical wall 334. The adaptor flange 350 is in abutting engagement with the outer major side surface 54*e* of the housing side wall 22*e*. An adjacent portion of the cylindrical wall 334 of the adaptor 332 is in abutting engagement with the flange 60*e* of the housing side wall 22*e*.

The inflator 90*e* includes a threaded mounting stud 96*e* which projects axially through the opening 344 in the adaptor end wall 338 and through the opening 44*e* in the housing side wall 20*e*. A nut 98*e* secures together the mounting stud 96*e*, the housing side wall 20*e*, and the adaptor wall 338. Thus, the left end portion (as viewed in FIG. 10) of the inflator 90*e* is supported on the housing side wall 20*e*.

An annular rib 352 projects radially inward from the cylindrical wall 334 of the adaptor 332. The rib 352 has an inner peripheral surface 354 in abutting engagement with the outer peripheral surface 336 of the inflator 90*e*. Thus, the adaptor 332 supports the right end portion (as viewed in FIG. 9) of the inflator 90*e* at a location spaced inwardly of the planar main body portion 50*e* of the housing second side wall 22*e*.

Figure 10:
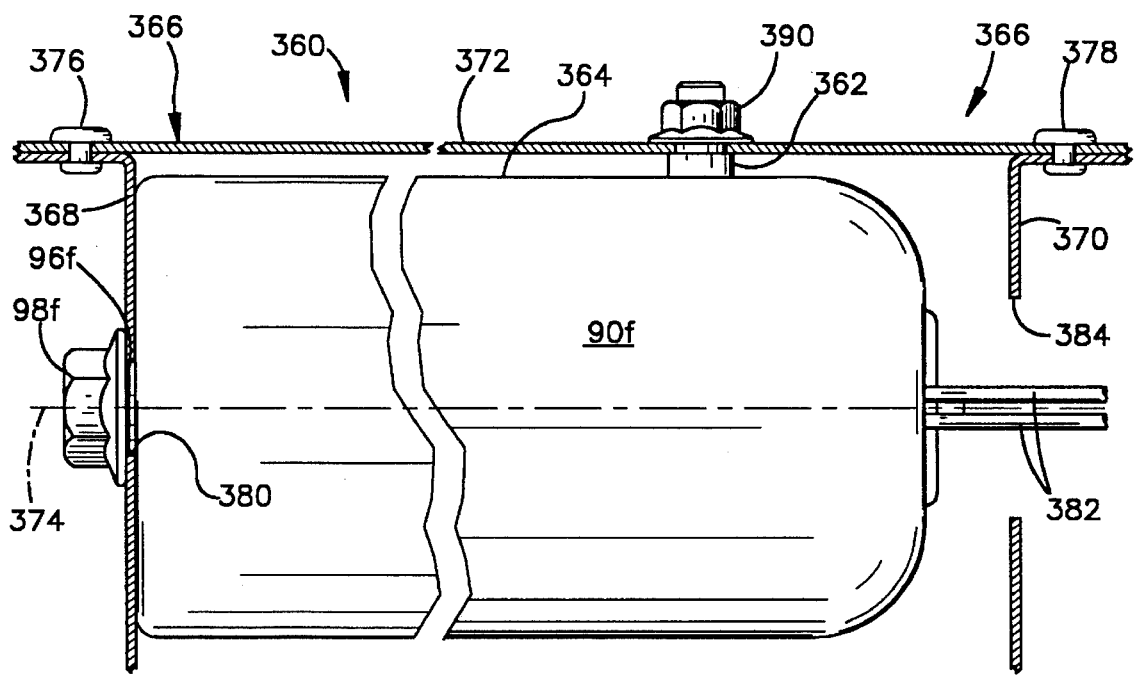
FIG. 10 illustrates a vehicle safety apparatus in accordance with a seventh embodiment of the invention.

FIG. 10 illustrates a vehicle safety apparatus 360 in accordance with a seventh embodiment of the invention. The vehicle safety apparatus 360 includes an inflator 90*f* which is similar to the inflator 90 shown in FIGS. 1–4. An adaptor comprises a side mounting stud 362 projecting radially outward from an outer peripheral surface 364 of the inflator.

The safety apparatus 360 includes a housing 366. Opposed parallel side walls 368 and 370 of the housing are joined by a separate back wall 372. The back wall 372 extends parallel to an axis 374 of the safety apparatus 360. A plurality of rivets, one of which is shown at 376, join the housing side wall 368 to the back wall 372. A plurality of rivets, one of which is shown at 378, join the housing side wall 370 to the back wall 372.

A threaded end mounting stud 96*f* of the inflator 90*f* extends through a circular opening 380 in the housing side wall 368. A nut 98*f* threaded on the stud 96*f* secures the left end portion (as viewed in FIG. 10) of the inflator 90*f* to the housing side wall 368. A pair of lead wires 382 of the inflator 90*f* extend axially through an opening 384 in the opposite housing side wall 370.

A nut 390 is threaded on the side mounting stud 362. The nut 390 cooperates with the side mounting stud 362 to secure the inflator 90*f* to the housing back wall 372. Accordingly, even though the right end portion (as viewed in FIG. 10) of the inflator 90*f* is spaced inwardly from the housing second side wall 370, the inflator 90*f* is still secured in position relative to the housing 366.

From the above description of the invention, those skilled in the art will perceive improvements, changes and modifications in the invention. For example, the threaded mounting stud 96 and nut 98 could be replaced with a non-threaded projection on the inflator and a toothed fastener. The fastener could be pushed onto the projection to grip the projection with its teeth. Also, a pair of identical adaptors such as the adaptors 140, 270, or 300 could be used to secure opposite end portions of a single inflator to a housing. Such improvements, changes and modifications within the skill of the art are intended to be covered by the appended claims.

Having described the invention, we claim:

1. An apparatus for inflating an inflatable vehicle occupant restraint such as an air bag, said apparatus comprising:

an inflator having an axis, a first end portion, a second end portion, and a cylindrical side wall connecting said first and second end portions, said side wall having a curved end portion forming a part of said second end portion;

a housing having a chamber receiving said inflator, said housing having first and second side walls spaced from each other and at least partially defining said chamber;

means for securing said first end portion of said inflator to said first side wall; and means for securing said second end portion of said inflator to said second side wall comprising an adaptor having a first portion engaging said second side wall and a second portion engaging and supporting said inflator at a location in said chamber spaced inward from said housing second side wall.

2. An apparatus as set forth in claim 1 wherein said second side wall has a generally planar main body portion, said second end portion of said inflator being disposed at a location in said chamber spaced inward from a reference plane which is coplanar with said main body portion of said second side wall.

3. An apparatus as set forth in claim 2 wherein said second side wall has a flange portion extending around said opening and projecting inwardly into said chamber from said main body portion in a direction transverse to said reference plane, said adaptor first portion engaging said flange portion of said second side wall.

4. An apparatus as set forth in claim 1 comprising means for blocking axial movement of said inflator in a first direction generally perpendicular to said second side wall, said means for blocking comprising surfaces on said adaptor defining a groove on said adaptor, a portion of said second side wall being received in said groove radially inward of the outer periphery of said adaptor.

5. An apparatus as set forth in claim 4 wherein said second side wall of said housing has a generally planar main body portion defining a reference plane, said portion of said second side wall being received in said groove comprising a flange portion of said side wall projecting inwardly into said chamber from said main body portion and from said reference plane in a direction generally perpendicular to said reference plane.

6. An apparatus as set forth in claim 5 wherein said adaptor surfaces defining said groove include an annular radially extending surface defining an axially inner end of said groove, said flange portion having a radially extending axially inward end surface in abutting engagement with said radially extending surface of said groove.

7. An apparatus as set forth in claim 1 wherein said inflator includes an igniter and an end cap supporting said igniter at the second end portion of said inflator, said inflator including a side wall disposed outward of said igniter, said side wall of said inflator including a curved end portion engaging said end cap and securing said end cap in said inflator, said adaptor engaging said inflator side wall at a location in said chamber spaced inward from said housing second side wall.

8. An apparatus as set forth in claim 7 wherein said adaptor engages a cylindrical portion of said inflator side wall disposed axially inward of said curved end portion.

9. An apparatus as set forth in claim 1 wherein said adaptor includes a first portion engaging said second side wall and a second portion spaced axially inward from said first portion, said adaptor second portion being disposed only in said chamber and engaging said inflator only in said chamber.

10. An apparatus as set forth in claim 9 wherein said inflator includes a side wall having a curved end portion, said second wall portion of said adaptor engaging a cylindrical portion of said inflator side wall disposed axially inward of said curved end portion.

11. An apparatus as set forth in claim 1 wherein said adaptor comprises an annular axially extending member coaxial with said inflator, said annular member having an inner peripheral surface engaging said inflator only at a first location in said chamber spaced inward from said second side wall, said cylindrical member having an outer peripheral surface engaging said second side wall at a second location spaced axially outward from said first location.

12. An apparatus as set forth in claim 11 wherein said adaptor has outer peripheral surface portions defining an external groove on said adaptor, a portion of said second side wall being received in said groove radially inward of the outer periphery of said adaptor.

13. An apparatus as set forth in claim 12 wherein said second side wall of said housing has a generally planar main body portion defining a reference plane, said inflator being disposed in said chamber axially inward of said reference plane, said portion of said second side wall being received in said groove comprising a flange portion of said side wall extending around said opening and projecting inwardly into said chamber from said main body portion in a direction generally perpendicular to said reference plane.

14. An apparatus as set forth in claim 1 wherein said second side wall has annular surfaces defining a circular opening through which said inflator is insertable into said chamber to be secured to said housing, said adaptor being supported on said annular housing surfaces and having an inner portion disposed in said chamber axially inward of said second side wall, said adaptor inner portion having an overall outer diameter greater than the diameter of said opening, said adaptor having an outer portion disposed axially outward of said second side wall, said adaptor having means for defining a gap in said adaptor and for enabling movement of said adaptor inner portion axially through said opening and into said chamber.

15. An apparatus as set forth in claim 1 wherein said adaptor comprises a single tubular member, said adaptor first portion comprising an annular radially extending flange portion of said tubular member disposed axially outward of said second side wall and in abutting engagement with said second side wall, said adaptor second portion comprising a cylindrical wall portion of said tubular member extending into said chamber from said flange portion and engaging an outer peripheral surface of said inflator, said apparatus further comprising fastener means for securing said adaptor flange portion to said housing side wall.

16. An apparatus as set forth in claim 1 wherein said adaptor comprises an axially inward projecting tubular portion of said housing side wall, said adaptor first portion comprising a cylindrical outer wall portion of said tubular portion extending into said chamber from said flange portion, said adaptor second portion comprising a cylindrical inner wall portion of said tubular member extending into said chamber from said outer wall portion and engaging an outer peripheral surface of said inflator.

17. An apparatus as set forth in claim 1 wherein said adaptor comprises a tubular member having one open end and an opposite closed end, said adaptor first portion comprising a cylindrical wall portion of said tubular member having an annular radially extending flange disposed axially outward of said second side wall and in abutting engagement with said second side wall, said adaptor second portion comprising an end wall of said tubular member extending radially inward from said cylindrical wall portion, said end wall having surfaces engaging said inflator at a location in said chamber spaced inward from said housing second side wall, said apparatus further comprising fastener means for securing said adaptor end wall to said second end portion of said inflator.

18. An apparatus as set forth in claim 1 wherein said adaptor comprises an externally threaded tubular member, said adaptor first portion comprising an external thread convolution on said tubular member in threaded engagement with said housing second side wall, said adaptor second portion comprising a curved inner end surface of said tubular member disposed axially inward of said housing side wall and in abutting engagement with said second end portion of said inflator at a location in said chamber spaced inward from said housing second side wall.

19. An apparatus as set forth in claim 1 wherein said adaptor comprises a tubular member, said means for securing said first end portion of said inflator to said first side wall comprising a radially extending end wall of said tubular member in abutting engagement with said first side wall, said tubular member having a cylindrical wall portion extending axially from said end wall in a direction toward said second side wall, said adaptor second portion comprising an annular rib on said cylindrical wall portion engaging an outer peripheral surface of said inflator at a location spaced inward from said second side wall, said adaptor first portion comprising an annular radially extending flange portion of said tubular member disposed axially outward of said second side wall and in abutting engagement with said second side wall.

20. An apparatus as set forth in claim 1 wherein said adaptor comprises a top wall extending between and interconnecting said first and second housing side walls, first fastener means for securing said top wall to said housing first side wall, second fastener means for securing said top wall to said housing second side wall, said top wall having an opening, a threaded member projecting radially from said inflator second end portion through said opening, and a nut threaded on said threaded member to secure said inflator second end portion to said top wall.

21. An apparatus for inflating an inflatable vehicle occupant restraint such as an air bag, said apparatus comprising:

an inflator having an igniter and an end cap supporting said igniter at a first end portion of said inflator, said inflator including a cylindrical side wall disposed outward of said igniter, said side wall including a curved end portion engaging said end cap to secure said end cap in said inflator;

a housing having a chamber receiving said inflator, said housing having first and second side walls spaced from each other and at least partially defining said chamber; and means for securing said inflator to said housing including means for securing said first end portion of said inflator to one of said housing side walls comprising an adaptor extending between said inflator and said one of said housing side walls, said adaptor having a surface engaging said inflator side wall and supporting said first end portion of said inflator.

22. An apparatus as set forth in claim 21 wherein said inflator side wall includes a cylindrical portion disposed axially inward from said curved end portion, said adaptor surface engaging said cylindrical portion of said inflator side wall.

23. An apparatus as set forth in claim 22 wherein said igniter is supported in a chamber of said end cap, said end cap having an outer surface engaging an inner surface of said curved end portion of said inflator side wall, said curved end portion having an opening, said end cap having a portion exposed through said opening in said curved end portion of said side wall.

24. An apparatus as set forth in claim 23 wherein said adaptor comprises an axially extending annular member which is coaxial with said inflator and which includes said adaptor surface engaging said inflator side wall, said annular member having surface portions defining an external groove on said adaptor, a portion of said one housing side wall being received in said groove radially inward of the outer periphery of said adaptor.

25. An apparatus as set forth in claim 24 wherein said one housing side wall has an annular surface at least partially defining a circular opening through which said inflator is insertable into said chamber to be secured to said housing, said adaptor being supported on said annular housing surface and having an inner portion disposed in said chamber axially inward of said one housing side wall, said adaptor inner portion having an overall outer diameter greater than the diameter of said opening, said adaptor having an outer portion disposed axially outward of said one housing side wall, said adaptor including means for defining a gap in said adaptor and for enabling movement of said adaptor inner portion axially through said opening and into said chamber.

26. An apparatus as set forth in claim 21 wherein said adaptor surface engages said inflator side wall and supports said first end portion of said inflator at a location in said chamber spaced inward from said one housing side wall.

27. An apparatus for inflating an inflatable vehicle occupant restraint such as an air bag, said apparatus comprising:

an inflator having an axis and having first and second spaced end portions;

a housing having a chamber receiving said inflator, said housing having first and second side walls spaced from each other and at least partially defining said chamber;

means for securing said first end portion of said inflator to said first side wall;

means for securing said second end portion of said inflator to said second side wall comprising an adaptor having a first portion engaging said second side wall and a second portion engaging and supporting said inflator at a location in said chamber spaced inward from said housing second side wall;

said second side wall having a generally planar main body portion, said second end portion of said inflator being disposed at a location in said chamber spaced inward from a reference plane which is coplanar with said main body portion of said second side wall; and said second side wall having a flange portion extending around said opening and projecting inwardly into said chamber from said main body portion in a direction transverse to said reference plane, said adaptor first portion engaging said flange portion of said second side wall.

28. An apparatus for inflating an inflatable vehicle occupant restraint such as an air bag, said apparatus comprising:

an inflator having an axis and having first and second spaced end portions;

a housing having a chamber receiving said inflator, said housing having first and second side walls spaced from each other and at least partially defining said chamber;

means for securing said first end portion of said inflator to said first side wall;

means for securing said second end portion of said inflator to said second side wall comprising an adaptor having a first portion engaging said second side wall and a second portion engaging and supporting said inflator at a location in said chamber spaced inward from said housing second side wall;

means for blocking axial movement of said inflator in a first direction generally perpendicular to said second side wall, said means for blocking comprising surfaces on said adaptor defining a groove on said adaptor, a portion of said second side wall being received in said groove radially inward of the outer periphery of said adaptor; and said second side wall of said housing having a generally planar main body portion defining a reference plane, said portion of said second side wall being received in said groove comprising a flange portion of said side wall projecting inwardly into said chamber from said main body portion and from said reference plane in a direction generally perpendicular to said reference plane.

29. An apparatus for inflating an inflatable vehicle occupant restraint such as an air bag, said apparatus comprising:

an inflator having an axis and having first and second spaced end portions;

a housing having a chamber receiving said inflator, said housing having first and second side walls spaced from each other and at least partially defining said chamber;

means for securing said first end portion of said inflator to said first side wall;

means for securing said second end portion of said inflator to said second side wall comprising an adaptor having a first portion engaging said second side wall and a second portion engaging and supporting said inflator at a location in said chamber spaced inward from said housing second side wall;

means for blocking axial movement of said inflator in a first direction generally perpendicular to said second side wall, said means for blocking comprising surfaces on said adaptor defining a groove on said adaptor, a portion of said second side wall being received in said groove radially inward of the outer periphery of said adaptor;

said second side wall of said housing having a generally planar main body portion defining a reference plane, said portion of said second side wall being received in said groove comprising a flange portion of said side wall projecting inwardly into said chamber from said main body portion and from said reference plane in a direction generally perpendicular to said reference plane; and said adaptor surfaces defining said groove including an annular radially extending surface defining an axially inner end of said groove, said flange portion having a radially extending axially inward end surface in abutting engagement with said radially extending surface of said groove.

30. An apparatus for inflating an inflatable vehicle occupant restraint such as an air bag, said apparatus comprising:

an inflator having an axis and having first and second spaced end portions;

a housing having a chamber receiving said inflator, said housing having first and second side walls spaced from each other and at least partially defining said chamber;

means for securing said first end portion of said inflator to said first side wall;

means for securing said second end portion of said inflator to said second side wall comprising an adaptor having a first portion engaging said second side wall and a second portion engaging and supporting said inflator at a location in said chamber spaced inward from said housing second side wall;

said adaptor comprising an annular axially extending member coaxial with said inflator, said annular member having an inner peripheral surface engaging said inflator only at a first location in said chamber spaced inward from said second side wall, said cylindrical member having an outer peripheral surface engaging said second side wall at a second location spaced axially outward from said first location;

said adaptor having outer peripheral surface portions defining an external groove on said adaptor, a portion of said second side wall being received in said groove radially inward of the outer periphery of said adaptor; and said second side wall of said housing having a generally planar main body portion defining a reference plane, said inflator being disposed in said chamber axially inward of said reference plane, said portion of said second side wall being received in said groove comprising a flange portion of said side wall extending around said opening and projecting inwardly into said chamber from said main body portion in a direction generally perpendicular to said reference plane.

31. An apparatus for inflating an inflatable vehicle occupant restraint such as an air bag, said apparatus comprising:

an inflator having an axis and having first and second spaced end portions;

a housing having a chamber receiving said inflator, said housing having first and second side walls spaced from each other and at least partially defining said chamber;

means for securing said first end portion of said inflator to said first side wall;

means for securing said second end portion of said inflator to said second side wall comprising an adaptor having a first portion engaging said second side wall and a second portion engaging and supporting said inflator at a location in said chamber spaced inward from said housing second side wall; and said second side wall having annular surfaces defining a circular opening through which said inflator is insertable into said chamber to be secured to said housing, said adaptor being supported on said annular housing surfaces and having an inner portion disposed in said chamber axially inward of said second side wall, said adaptor inner portion having an overall outer diameter greater than the diameter of said opening, said adaptor having an outer portion disposed axially outward of said second side wall, said adaptor having means for defining a gap in said adaptor and for enabling movement of said adaptor inner portion axially through said opening and into said chamber.

32. An apparatus for inflating an inflatable vehicle occupant restraint such as an air bag, said apparatus comprising:

an inflator having an axis and having first and second spaced end portions;

a housing having a chamber receiving said inflator, said housing having first and second side walls spaced from each other and at least partially defining said chamber;

means for securing said first end portion of said inflator to said first side wall;

means for securing said second end portion of said inflator to said second side wall comprising an adaptor having a first portion engaging said second side wall and a second portion engaging and supporting said inflator at a location in said chamber spaced inward from said housing second side wall; and said adaptor comprising an externally threaded tubular member, said adaptor first portion comprising an external thread convolution on said tubular member in threaded engagement with said housing second side wall, said adaptor second portion comprising a curved inner end surface of said tubular member disposed axially inward of said housing side wall and in abutting engagement with said second end portion of said inflator at a location in said chamber spaced inward from said housing second side wall.

33. An apparatus for inflating an inflatable vehicle occupant restraint such as an air bag, said apparatus comprising:

an inflator having an axis and having first and second spaced end portions;

a housing having a chamber receiving said inflator, said housing having first and second side walls spaced from each other and at least partially defining said chamber;

means for securing said first end portion of said inflator to said first side wall;

means for securing said second end portion of said inflator to said second side wall comprising an adaptor having a first portion engaging said second side wall and a second portion engaging and supporting said inflator at a location in said chamber spaced inward from said housing second side wall; and said adaptor comprising a tubular member, said means for securing said first end portion of said inflator to said first side wall comprising a radially extending end wall of said tubular member in abutting engagement with said first side wall, said tubular member having a cylindrical wall portion extending axially from said end wall in a direction toward said second side wall, said adaptor second portion comprising an annular rib on said cylindrical wall portion engaging an outer peripheral surface of said inflator at a location spaced inward from said second side wall, said adaptor first portion comprising an annular radially extending flange portion of said tubular member disposed axially outward of said second side wall and in abutting engagement with said second side wall.

34. An apparatus for inflating an inflatable vehicle occupant restraint such as an air bag, said apparatus comprising:

an inflator having an axis and having first and second spaced end portions;

a housing having a chamber receiving said inflator, said housing having first and second side walls spaced from each other and at least partially defining said chamber;

means for securing said first end portion of said inflator to said first side wall;

means for securing said second end portion of said inflator to said second side wall comprising an adaptor having a first portion engaging said second side wall and a second portion engaging and supporting said inflator at a location in said chamber spaced inward from said housing second side wall; and said adaptor comprising a top wall extending between and interconnecting said first and second housing side walls, first fastener means for securing said top wall to said housing first side wall, second fastener means for securing said top wall to said housing second side wall, said top wall having an opening, a threaded member projecting radially from said inflator second end portion through said opening, and a nut threaded on said threaded member to secure said inflator second end portion to said top wall.

35. An apparatus for inflating an inflatable vehicle occupant restraint such as an air bag, said apparatus comprising:

an inflator having an igniter and an end cap supporting said igniter at a first end portion of said inflator, said inflator including a side wall disposed outward of said igniter, said side wall including a curved end portion engaging said end cap to secure said end cap in said inflator;

a housing having a chamber receiving said inflator, said housing having first and second side walls spaced from each other and at least partially defining said chamber;

means for securing said inflator to said housing including means for securing said first end portion of said inflator to one of said housing side walls comprising an adaptor extending between said inflator and said one of said housing side walls, said adaptor having a surface engaging said inflator side wall and supporting said first end portion of said inflator;

said inflator side wall including a cylindrical portion disposed axially inward from said curved end portion, said adaptor surface engaging said cylindrical portion of said inflator side wall;

said igniter being supported in a chamber of said end cap, said end cap having an outer surface engaging an inner surface of said curved end portion of said inflator side wall, said curved end portion having an opening, said end cap having a portion exposed through said opening in said curved end portion of said side wall;

said adaptor comprising an axially extending annular member which is coaxial with said inflator and which includes said adaptor surface engaging said inflator side wall, said annular member having surface portions defining an external groove on said adaptor, a portion of said one housing side wall being received in said groove radially inward of the outer periphery of said adaptor; and said one housing side wall having an annular surface at least partially defining a circular opening through which said inflator is insertable into said chamber to be secured to said housing, said adaptor being supported on said annular housing surface and having an inner portion disposed in said chamber axially inward of said one housing side wall, said adaptor inner portion having an overall outer diameter greater than the diameter of said opening, said adaptor having an outer portion disposed axially outward of said one housing side wall, said adaptor including means for defining a gap in said adaptor and for enabling movement of said adaptor inner portion axially through said opening and into said chamber.

36. An apparatus as set forth in claim 1 wherein said adaptor is made of a resilient material.

* * * * *